(12) United States Patent
Shimo et al.

(10) Patent No.: US 7,177,104 B2
(45) Date of Patent: Feb. 13, 2007

(54) IMAGE-TAKING OPTICAL SYSTEM

(75) Inventors: Mitsuaki Shimo, Osaka (JP); Soh Ohzawa, Toyonaka (JP); Jun Ishihara, Kobe (JP); Kenji Konno, Sakai (JP)

(73) Assignee: Konica Minolta Opto, Inc., Hachioji (JP)

( * ) Notice: Subject to any disclaimer, the term of this patent is extended or adjusted under 35 U.S.C. 154(b) by 0 days.

(21) Appl. No.: 11/243,786

(22) Filed: Oct. 5, 2005

(65) Prior Publication Data

US 2006/0077578 A1    Apr. 13, 2006

(30) Foreign Application Priority Data

Oct. 13, 2004  (JP) ............... 2004-298383

(51) Int. Cl.
*G02B 5/04* (2006.01)
(52) U.S. Cl. .................... 359/834; 359/630
(58) Field of Classification Search ........... 359/833, 359/834, 837, 630
See application file for complete search history.

(56) References Cited

U.S. PATENT DOCUMENTS

| | | | | |
|---|---|---|---|---|
| 5,701,202 A | 12/1997 | Takahashi | ........... | 359/631 |
| 5,745,295 A | 4/1998 | Takahashi | ........... | 359/631 |
| 5,812,323 A | 9/1998 | Takahashi | ........... | 359/630 |
| 5,815,326 A | 9/1998 | Takahashi | ........... | 359/729 |
| 5,818,641 A | 10/1998 | Takahashi | ........... | 359/629 |
| 6,008,948 A | 12/1999 | Togino | ........... | 359/637 |
| 6,084,715 A | 7/2000 | Aoki et al. | ........... | 359/627 |
| 6,094,315 A | 7/2000 | Aoki | ........... | 359/731 |
| 6,178,048 B1 | 1/2001 | Togino et al. | ........... | 359/637 |
| 6,178,052 B1 | 1/2001 | Aoki et al. | ........... | 359/730 |
| 6,278,556 B1 | 8/2001 | Togino | ........... | 359/637 |
| 6,301,064 B1 | 10/2001 | Araki et al. | ........... | 359/834 |
| 6,310,736 B1 | 10/2001 | Togino | ........... | 359/834 |
| 6,590,713 B2 | 7/2003 | Okuyama | ........... | 359/631 |
| 6,603,608 B2 | 8/2003 | Togino | ........... | 359/676 |
| 6,671,099 B2 | 12/2003 | Nagata | ........... | 359/629 |
| 6,687,029 B2 | 2/2004 | Amanai et al. | ........... | 359/13 |
| 7,081,999 B2 * | 7/2006 | Yamazaki | ........... | 359/630 |

FOREIGN PATENT DOCUMENTS

| | | |
|---|---|---|
| JP | 11-271618 A | 10/1999 |
| JP | 2000-47110 A | 2/2000 |
| JP | 2000-221404 A | 8/2000 |
| JP | 2001-166209 A | 6/2001 |
| JP | 2001-201689 A | 7/2001 |
| JP | 2001-264633 A | 9/2001 |
| JP | 2002-311378 A | 10/2002 |
| JP | 2002-311380 A | 10/2002 |

* cited by examiner

*Primary Examiner*—Euncha P. Cherry
(74) *Attorney, Agent, or Firm*—Sidley Austin LLP

(57) ABSTRACT

An image-taking optical system for forming an optical image of an object on the light-receiving surface of an image sensor includes a plurality of optical blocks. The optical blocks each have a prism unit provided with a curved surface and an optical unit composed of a member different from a member composing the prism unit. The prism unit uses the curved surface as a total reflection surface and also as a transmission surface. The optical unit has near the curved surface a curved surface identically or substantially identically shaped therewith.

12 Claims, 6 Drawing Sheets

IMAGE-TAKING OPTICAL SYSTEM

This application is based on Japanese Patent Application No. 2004-298383 filed on Oct. 13, 2004, the contents of which are hereby incorporated by reference.

BACKGROUND OF THE INVENTION

1. Field of the Invention

The present invention relates to an image-taking optical system. More particularly, the present invention relates to a slim-type image-taking optical system suitable for, for example, a digital appliance equipped with an image capturing capability that captures an image of a subject with an image sensor.

2. Description of Related Art

In recent years, more and more cellular phones and personal digital assistants (PDAs) have been equipped with a built-in digital still camera or a built-in digital video unit for taking in images. There has been a growing demand for such digital appliances to be more downsized in view of portability but also to offer a higher performance in providing image information. To achieve a higher performance in providing image information, the number of pixels included in the image sensor which takes in images has been increased. Following this increase in the number of pixels included in the image sensor, downsizing of an element composing one pixel has also been in development. However, the overall size of the image sensor inevitably increases, resulting in an increase in the required image size and further a higher resolution required for the increased number of pixels. As a conventional image-taking optical system, a coaxial optical system called a straight-type optical system has been used. With this type, increasing the image size and the resolution involves an increase in the number of lenses used and an increase in the full length, which can be assumed to go against the downsizing of cellular phones and PDAs. Therefore, approaches to downsizing and slimming-down needs to be made by using not the straight type but a different type of an image-taking optical system.

As an image-taking optical system of a type different from the straight type, an optical system that employs a prism having a reflection surface is well-known. With this type, downsizing and slimming-down of the image-taking optical system is achieved by bending an optical path with the reflection surface. Methods of bending an optical path include repeating reflection within one prism, arranging a plurality of prisms so as to perform reflection a plurality of times, and the like. In addition, known also is an optical system that bends an optical path by using one surface both as a total reflection surface and a transmission surface (hereinafter the surface functioning for this total reflection and transmission is referred to as a TIR surface). One of such optical systems is an optical system that employs a TIR surface as a curved surface to achieve downsizing and slimming-down. For example, patent document 1 proposes an imaging optical system that employs two TIR surfaces for two prisms so as to elongate the optical path. Patent document 2 proposes an imaging optical system that employs two TIR surfaces for two prisms so as to reduce the length from the incidence surface to the image surface for slimming-down. As employed in these optical systems, the structure such that one curved surface functions both as a reflection surface and a transmission surface has the potential for achieving downsizing and slimming-down of an optical system.

[Patent Document 1] Japanese Patent Application Laid-open No. 2001-166209

[Patent Document 2] Japanese Patent Application Laid-open No. HI 1-271618

However, the optical structure described in the patent document 1 results in a longer full length from the entrance surface to the image surface, making it difficult to take full advantage of a TIR surface in reducing the full length. The optical structure described in patent document 2, in which only two prisms are provided, has a limitation in providing a higher resolution. That is, the use of a TIR surface alone or the use of only a prism having a TIR surface has a limitation in achieving a higher performance while keeping a system compact.

SUMMARY OF THE INVENTION

In view of the problem described above, the present invention has been made, and it is an object of the invention to provide an image-taking optical system that is compact and slim and also provides a sufficiently high performance for an image sensor having a great number of pixels.

To achieve the object described above, according to one aspect of the invention, an image-taking optical system for forming an optical image of an object on the light-receiving surface of an image sensor includes a plurality of optical blocks each having a prism unit provided with a curved surface and an optical unit composed of a member different from a member composing the prism unit. The prism unit uses the curved surface as a total reflection surface and also as a transmission surface. The optical unit has near the curved surface a curved surface identically or substantially identically shaped therewith.

According to another aspect of the invention, an image-taking lens apparatus includes an image-taking optical system for forming an optical image and an image sensor for converting into an electrical signal the optical image formed by the image-taking lens system. The image-taking optical system includes a plurality of optical blocks each having a prism unit provided with a curved surface and an optical unit composed of a member different from a member composing the prism unit. The prism unit uses the curved surface as a total reflection surface and also as a transmission surface. The optical unit has near the curved surface a curved surface identically or substantially identically shaped therewith.

DETAILED DESCRIPTION OF PREFERRED EMBODIMENTS

Figure 1:
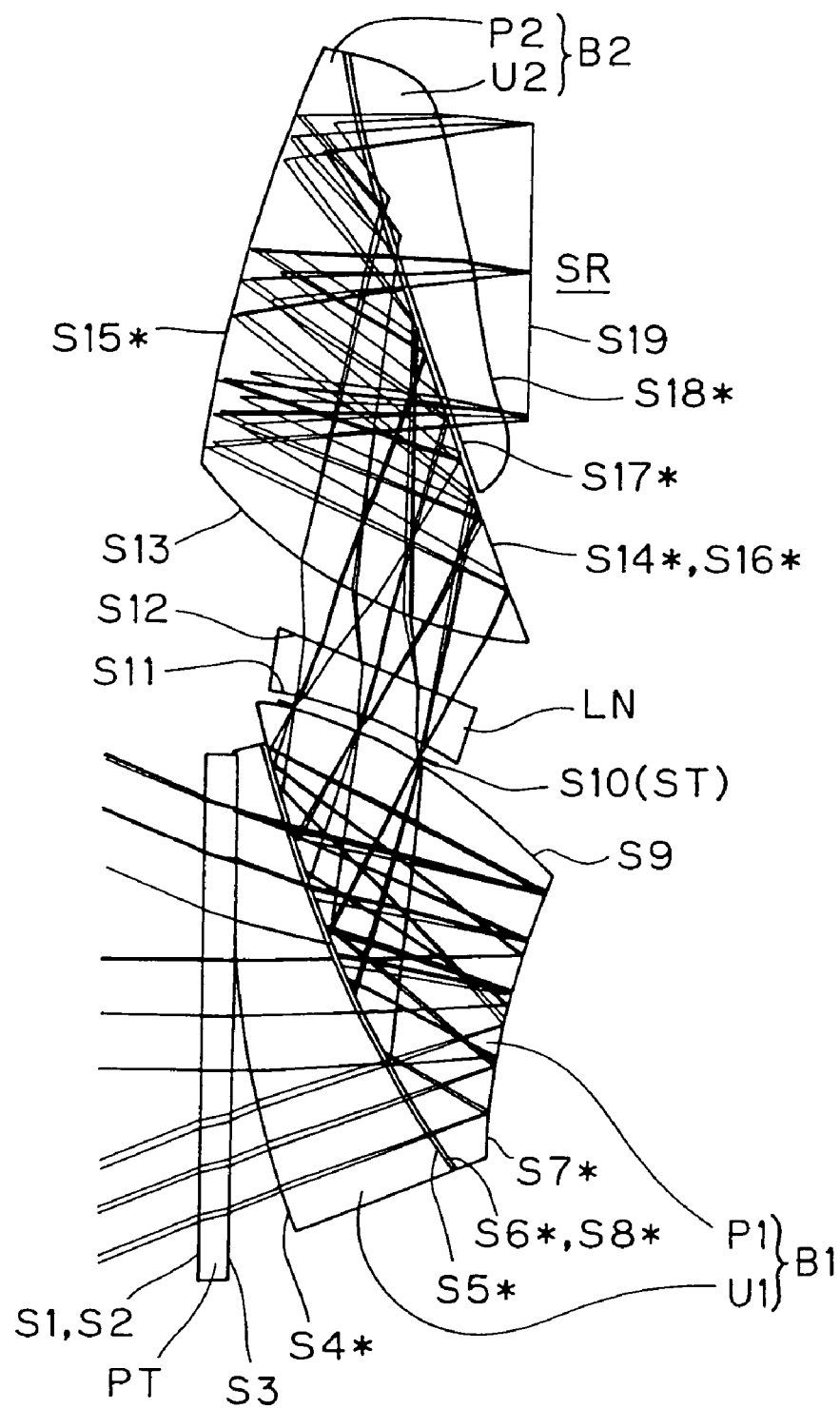
FIG. 1 is an optical path diagram of a first embodiment (Example 1) according to the present invention.
Figure 2:
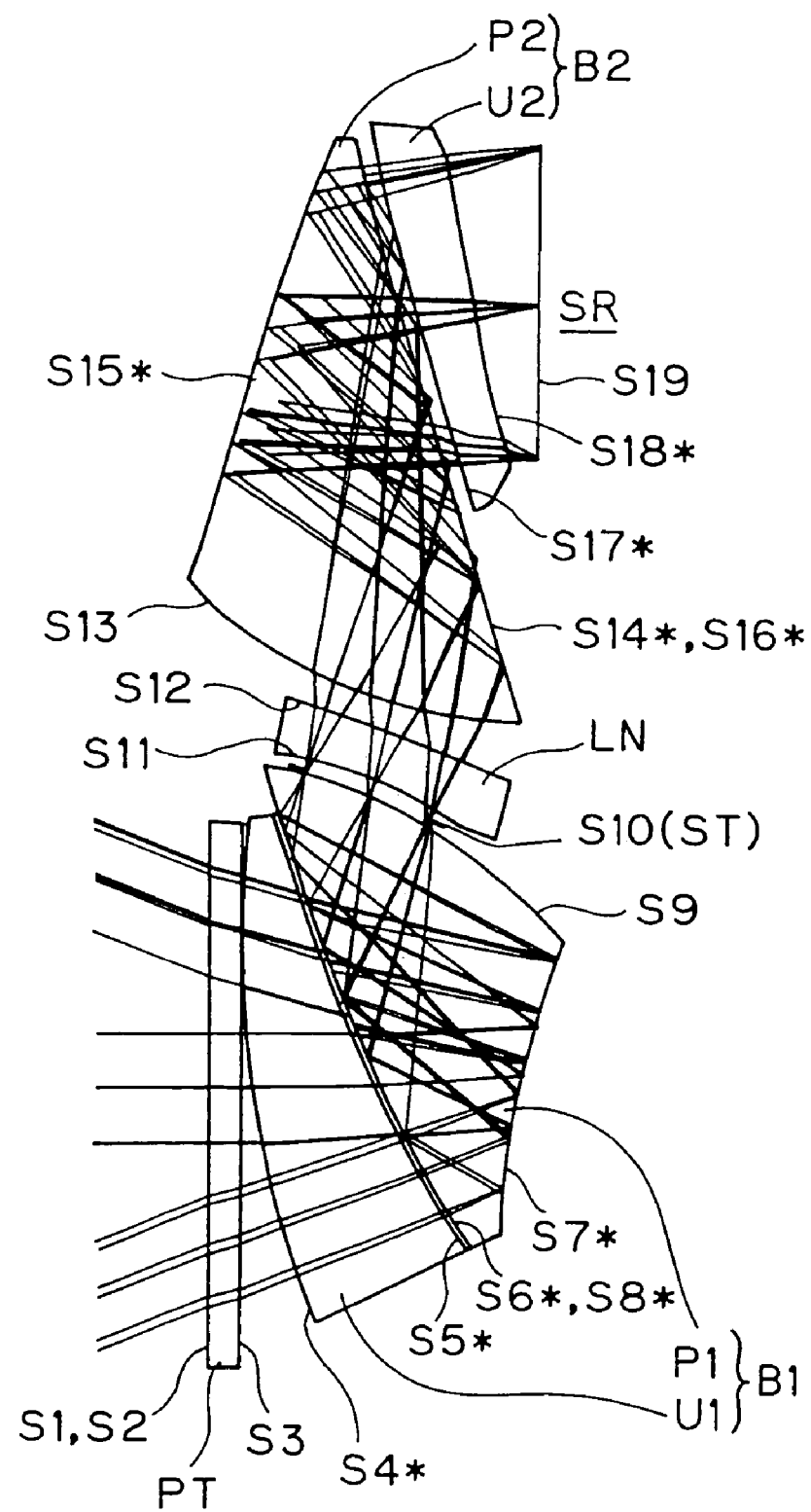
FIG. 2 is an optical path diagram of a second embodiment (Example 2) according to the invention.
Figure 3A:
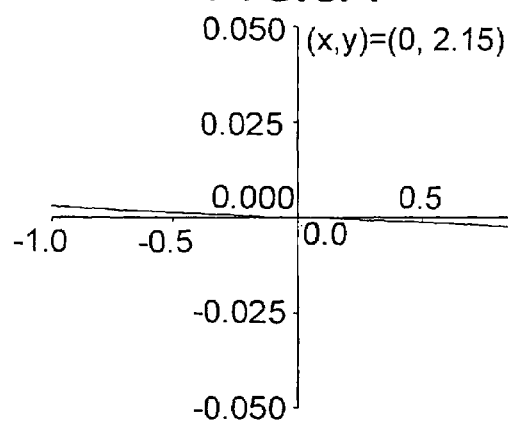
FIG. 3A to 3F are X-direction lateral aberration diagrams of Example 1.
Figure 3B:
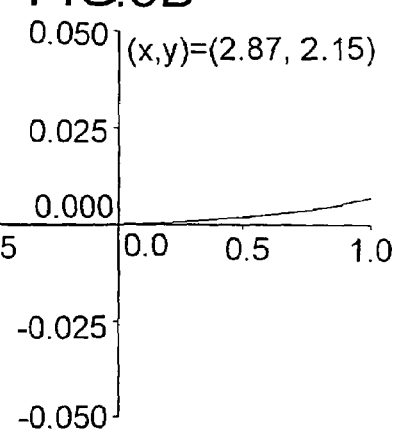
Figure 3C:
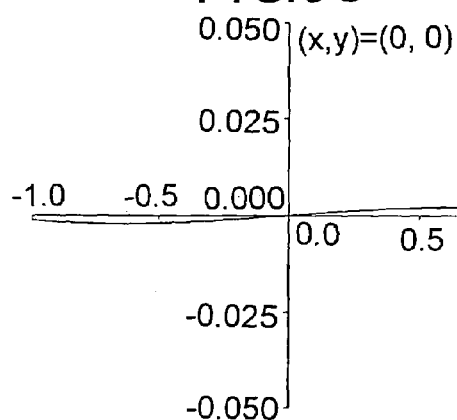
Figure 3D:
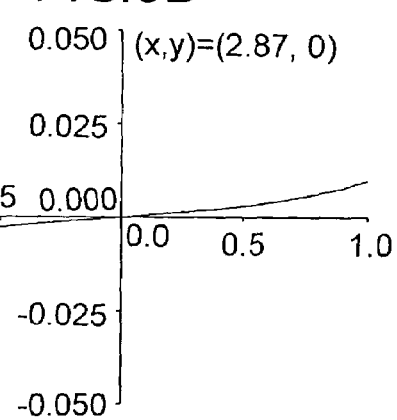
Figure 3E:
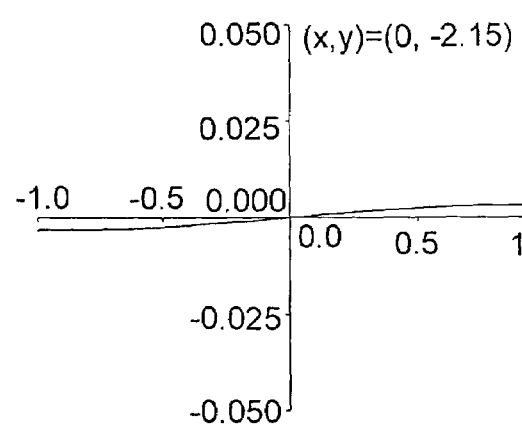
Figure 3F:
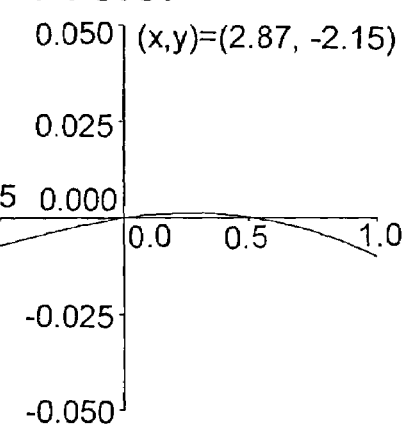
Figure 4A:
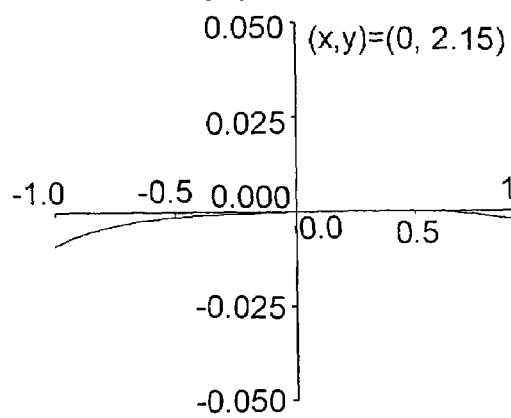
FIG. 4A to 4F are Y-direction lateral aberration diagrams of Example 1.
Figure 4B:
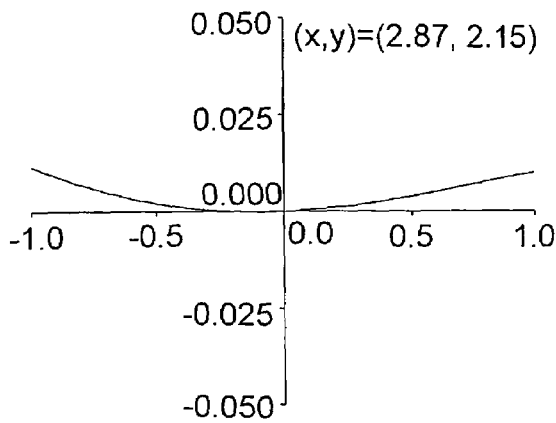
Figure 4C:
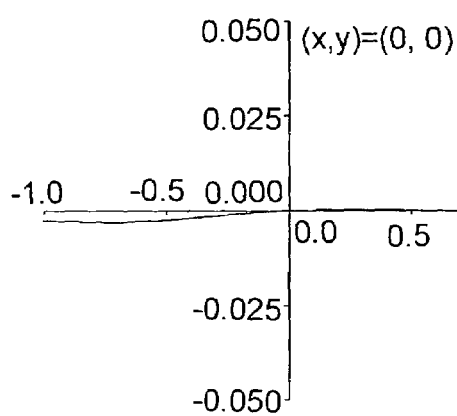
Figure 4D:
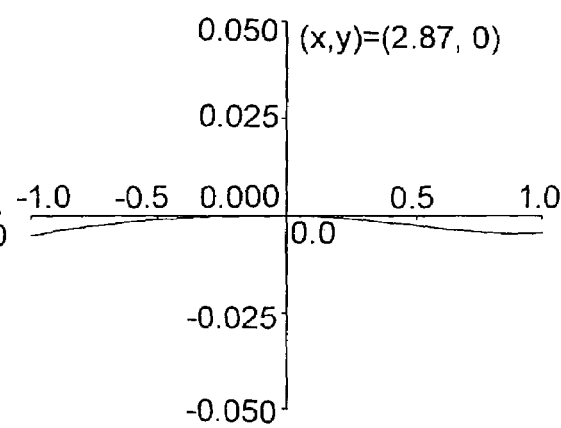
Figure 4E:
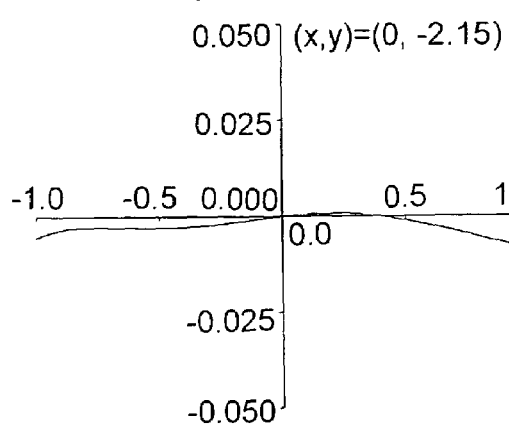
Figure 4F:
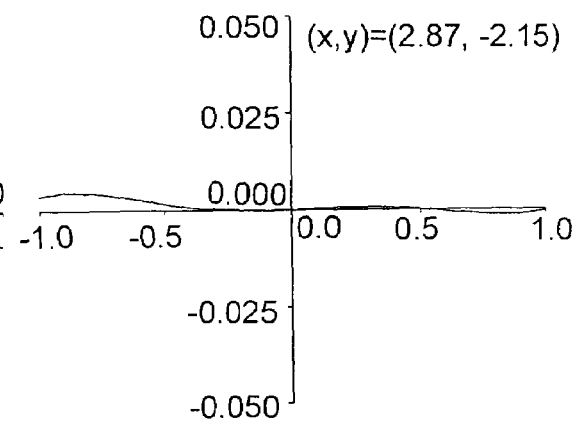
Figure 5A:
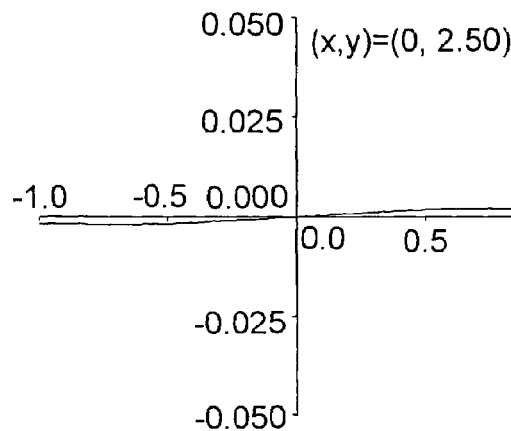
FIG. 5A to 5F are X-direction lateral aberration diagrams of Example 2.
Figure 5B:
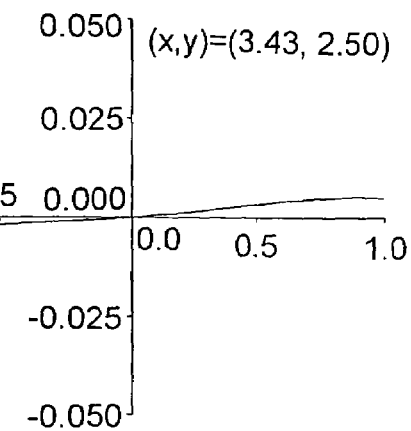
Figure 5C:
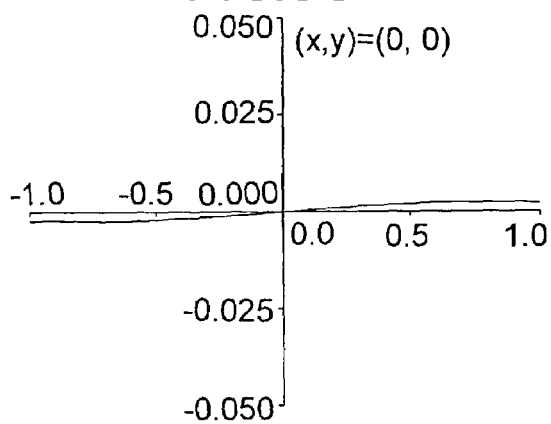
Figure 5D:
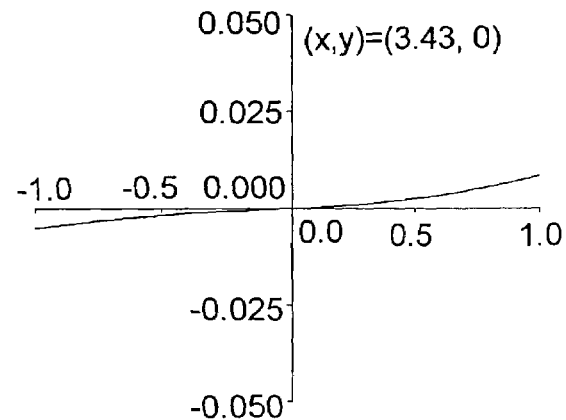
Figure 5E:
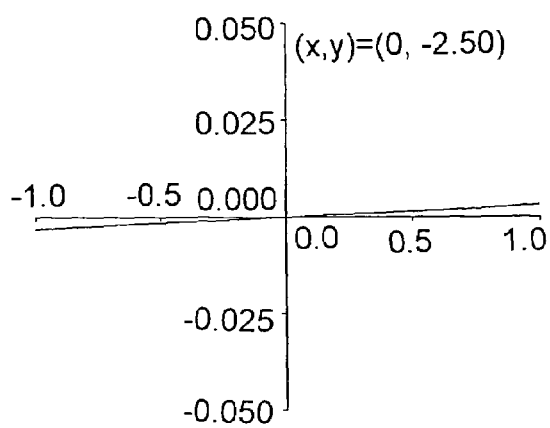
Figure 5F:
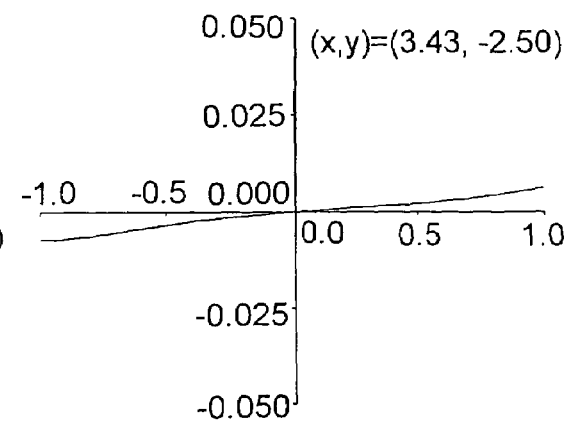
Figure 6A:
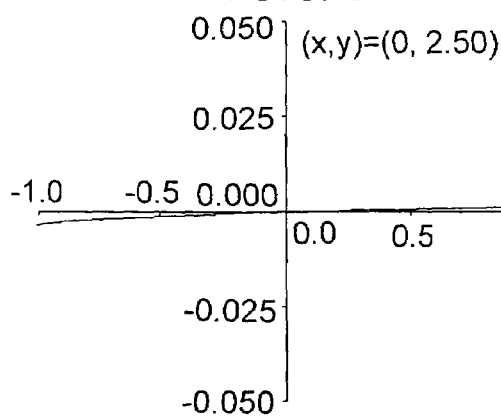
FIG. 6A to 6F are Y-direction lateral aberration diagrams of Example 2.
Figure 6B:
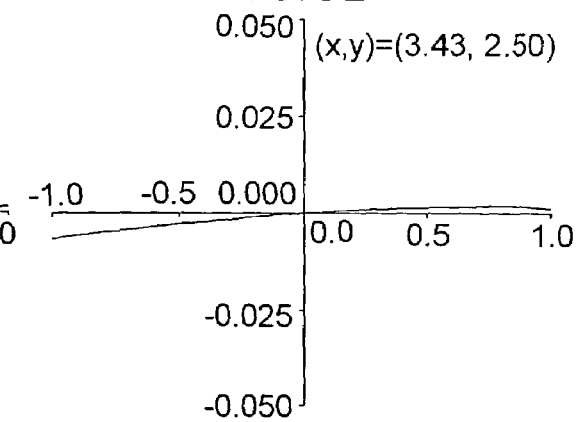
Figure 6C:
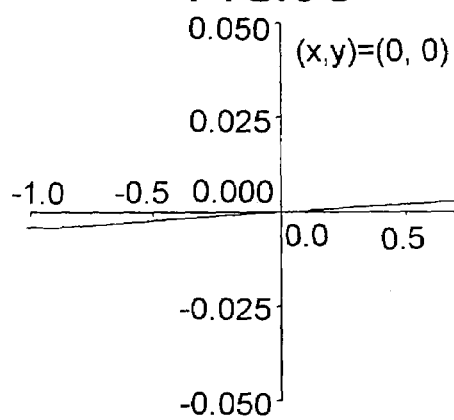
Figure 6D:
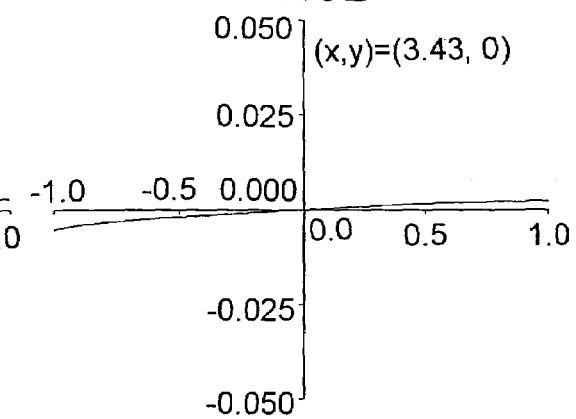
Figure 6E:
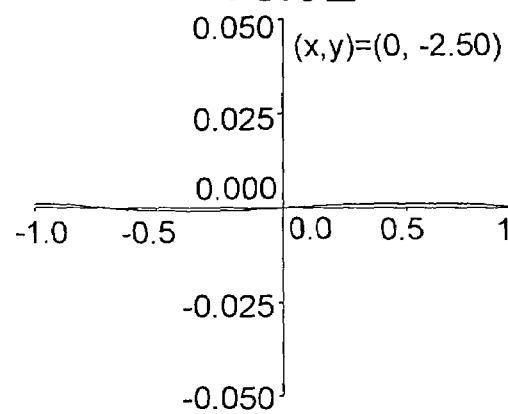
Figure 6F:
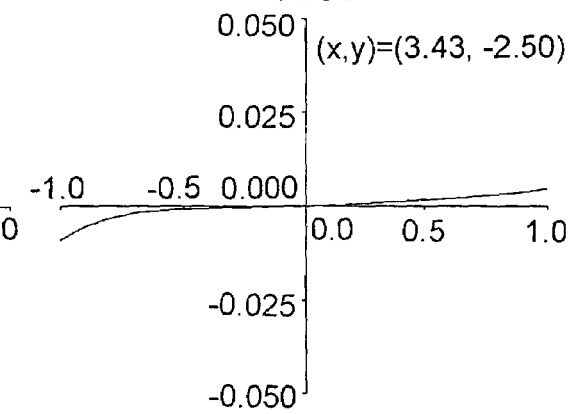

Embodiments of an image-taking optical system according to the present invention will be described below with reference to the accompanying drawings. FIGS. 1 and 2 show the optical structure of the first and second embodiments, respectively, in optical cross-sections. In FIGS. 1 and 2, a surface indicated by Si (i=1, 2, 3, . . . ) is the i-th surface counted from the object side, and a surface whose symbol Si is marked with an asterisk (*) is a free curved surface. Each of the image-taking optical systems of the embodiments is a fixed focal length lens that forms an optical image of an object, i.e., a subject, on the light-receiving surface of an image sensor SR, for example, a solid-state image sensor such as a CCD (charge coupled device) and that includes a first and a second optical blocks B1 and B2. The first optical block B1 has a first prism unit P1 and a first optical unit U1 composed of a member different from a member composing the first prism unit P1. The second optical block B2 has a second prism unit P2 and a second optical unit U2 composed of a member different from a member composing the second prism unit P2. Between the first and second optical blocks B1 and B2, there are arranged an optical aperture stop ST and a concave lens LN. On the most object side, there is arranged a parallel-plane plate PT corresponding to a protective glass.

The optical structure of the first and second embodiments will be described along an optical path. A first surface S1 is a dummy surface (reference surface) for indicating the position of the vertex of each surface to be described below. The surface located on the most object side in the image-taking optical system is a second surface S2. Light entering the image-taking optical system is first transmitted through the parallel-plane plate PT and then enters the first optical block B1. The first optical unit U1 composing the first optical block B1 has one entrance surface (a fourth surface) S4 and one exit surface (a fifth surface) S5. The fourth and fifth surfaces S4 and S5 are transmission surfaces each formed by a free curved surface. The light transmitted through the fourth and fifth surfaces S4 and S5 enters the first prism unit P1.

The first prism unit P1 composing the first optical block B1 is a total reflection prism. The light transmitted through the exit surface S5 of the first optical unit U1 is transmitted through an entrance surface (a sixth surface) S6 arranged near the exit surface S5 and then enters the first prism unit P1. The sixth surface S6 is a free curved surface identically (or substantially identically) shaped with the fifth surface S5. The light transmitted through the sixth surface S6 is reflected on a seventh surface S7 of the first prism unit P1 and then enters an eighth surface S8. The seventh surface S7 is a reflection surface formed with a free curved surface. The eighth surface S8 is a surface also serving as the sixth surface S6 (i.e., a TIR surface). The light entering the eighth surface S8 is reflected through total reflection on the eighth surface S8, and then exits out of the first prism unit P1 through an exit surface (a ninth surface) S9. Thus, in the first prism unit P1, the curved surface serving as S6 and S8 is used both as a transmission surface and as a total reflection surface.

The light exiting from the first prism unit P1 passes through the optical aperture stop (a tenth surface) S10 and then enters the concave lens LN. Then, after being transmitted through an entrance surface (an eleventh surface) S11 and an exit surface (a twelfth surface) S12 of the concave lens LN, the light enters the second optical block B2. The second prism unit P2 composing the second optical block B2 is a total reflection prism. The light enters the second prism unit P2 through a thirteenth surface S13. The light entering through the thirteenth surface S13 is reflected through total reflection on a fourteenth surface S14 and then enters a fifth surface S15. The fourteenth and fifteenth surfaces S14 and S15 are reflective surfaces each formed with a free curved surface. The light reflected on the fifth surface S15 enters a sixteenth surface S16. The sixteenth surface S16 is a surface also serving as the fourteenth surface S14 (i.e., a TIR surface). The light leaving the fifteenth surface S15 is transmitted through the sixteenth surface S16 and then exits out of the second prism unit P2. Thus, in the second prism unit P2, the curved surface serving as S14 and S16 is used both as total reflection surface and as a transmission surface.

The light exiting from the second prism unit P2 enters the second optical unit U2. The second optical unit U2 composing the second optical block B2 has one entrance surface (a seventeenth surface) S17 and one exit surface (an eighteenth surface) S18. The seventeenth and eighteenth surfaces S17 and S18 are transmission surfaces each formed with a curved surface. The seventeenth surface S17 of the second optical unit U2 is arranged near the exit surface S16 of the second prism unit P2 and is identically (or substantially identically) shaped with the sixteenth surface S16. The light transmitted through the seventeenth surface S17 exits out of the second optical unit U2 through the eighteen surface S18, and then reaches an image surface (a nineteenth surface) S19, whereby an optical image of a subject is formed on the light-receiving surface of the image sensor SR. The formed optical image is then converted into an electrical signal by the image sensor SR.

To achieve downsizing and slimming-down of an optical system, the optical path may be bent or folded, for which the use of a reflection surface is effective. For even further downsizing, it is advantageous to use one surface not only as a reflection surface but also as a surface functioning as a transmission surface. That is, it is preferable to use a TIR surface both as a total reflection surface and as a transmission surface. To enlarge the range of a working image while maintaining compactness, optical powers of a reflection surface and a refractive surface need to be increased. However, increasing the optical powers of such surfaces increases the amount of aberration, resulting in a reverse effect such that the size of the optical path needs to be increased to correct the aberration, which leads to upsizing of the optical system. The addition of a new surface can correct the aberrations; however, just adding a new surface leads to the upsizing of the optical system. Arranging near a TIR surface a new surface identically or substantially identically shaped with the TIR surface can achieve a higher performance while keeping the upsizing to a minimum. Moreover, the dispersion of an optical member composing this new surface may be varied to provide a function of suppressing chromatic aberration. The use of a single optical member having a TIR surface as described above alone is not sufficient to achieve a higher performance. It is not until a plurality of such members are used that a higher resolution can be achieved.

Therefore, as in each of the embodiments, it is preferable to provide a plurality of optical blocks each having a prism unit provided with a curved surface and an optical unit composed of a member different from a member composing the prism unit, in which the prism unit uses the curved surface as a total reflection surface and also as a transmission surface, and in which the optical unit has, near the curved surface, a curved surface identically or substantially identically shaped with the curved surface. This structure permits achieving a higher performance to catch up with an increase in the number of pixels included in the image sensor while achieving downsizing and slimming-down of the image-taking optical system.

For slimming-down of the image-taking optical system, it is preferable that conditional formula (1) below be fulfilled.

$$D/H < 2.0 \quad (1)$$

where
- H represents the length of a screen of the image sensor along the shorter side thereof, and
- D represents the length from the most object side surface of the image-taking optical system to the image sensor in the direction perpendicular to the screen of the image sensor.

The conditional formula (1) defines a preferable conditional range in regard to the slimming-down of the image-taking optical system. An increase in the number of pixels included in the image sensor increases the required image range accordingly, which involves upsizing of the image-taking optical system. If this conditional formula (1) is fulfilled, the slimming-down of the image-taking optical system can be maintained effectively. Disregarding the conditional range defined by the conditional formula (1) results in insufficient slimming-down and thus an insufficient effect provided by a TIR surface and also by a curved surface which is arranged near the TIR surface and whose is identical or substantially identical to that of the TIR surface.

It is further preferable that conditional formula (1a) below be fulfilled.

$$D/H < 1.5 \quad (1a)$$

This conditional formula (1a) defines, within the conditional range defined by the conditional formula (1), a conditional range further preferable out of the above-stated points and other considerations. If the conditional formula (1a) is fulfilled, even further slimming-down can be achieved.

In each of the embodiments, the fourth surface S4 to the eighth surface S8 and the fourteenth surface S14 to the eighteenth surface S18 are each formed with a free curved surface. In an optical system having a plurality of reflection surfaces as described above, it is preferable that free curved surfaces be used as optical surfaces, and also preferable that curved surfaces of prism units be free curved surfaces. When using a reflection surface in the optical system, attention needs to be given to the occurrence of asymmetrical aberration. In a case where a flat mirror performs reflection with an angle of incidence of 45 degrees with respect to the optical axis, aberration asymmetrical with respect to the optical axis does not occur. However, in some other cases, the asymmetrical aberration may occur, especially when a mirror (curved mirror in particular) is used in an off-axial system of a so-called "displaced-axis" type. Such asymmetrical aberration cannot be corrected on an axisymmetric curved surface sufficiently, thus requiring its correction by use of a non-axisymmetric curved surface. Therefore, it is preferable to use a free curved surface as a curved surface. It is further preferable that a non-axisymmetric curved surface (i.e., free curved surface) be used as a curved surface (in each embodiment, corresponding to the TIR surfaces S6, S8; S14, S16) which is also used as a reflection surface.

In each of the embodiments, the optical aperture stop ST is arranged between the first and second optical blocks B1 and B2. Thus, it is preferable in terms of aberration correction that an optical aperture stop be arranged between a plurality of optical blocks. The position of the optical aperture stop is closely related to the correction of distortion in particular. The arrangement of the optical aperture stop in the front area of the image-taking system tends to cause negative distortion while the arrangement of the optical aperture stop in the rear area of the image-taking system tends to cause positive distortion. Thus, it is more advantageous in appropriately correcting distortion to arrange the optical aperture stop in the middle area of the image-taking optical system. Especially when a plurality of reflection prisms are provided, the arrangement of the optical aperture stop therebetween not only permits satisfactory distortion correction but also is advantageous in correction of lateral chromatic aberration and coma. In addition to the optical aperture stop, a beam restricting plate or the like for cutting unnecessary light may be arranged as necessary.

In each of the embodiments, the concave lens LN is arranged between the first and second optical blocks B1 and B2. Thus, it is preferable in terms of image surface correction that a concave lens be provided between a plurality of optical blocks. Locating the optical aperture stop between the plurality of prisms results in that the ray height is smallest in this area. Thus, arranging a concave surface near this area permits this concave surface to be provided with a stronger optical power. As a result, the Petzval value is shifted in the negative direction, which is advantageous in image surface correction. It is therefore preferable that a concave lens be arranged between a plurality of optical blocks each having a prism unit and an optical unit.

In the image-taking optical system of each of the embodiments, refractive lens surfaces that deflect rays incident thereon by refraction (that is, lens surfaces on which light is deflected at the interface between two media having different refractive indices) are used. Any of those lens elements, however, may be replaced with a lens surface of any other type, for example: a diffractive lens surface, which deflects rays incident thereon by diffraction; or a refractive-diffractive hybrid lens surface, which deflects rays incident thereon by the combined effect of refraction and diffraction. In addition, a gradient index lens may be used which deflects rays incident thereon with a refractive index distribution within a medium. A gradient index lens, however, requires that its refractive index be varied within a medium and thus requires a complicated production process. Thus, using a gradient index lens element leads to higher cost. To avoid this, it is preferable to use lenses made of a material having a uniform refractive index distribution.

The image-taking optical system of each of the embodiments is suitable for use as a slim image-taking optical system for a digital appliance equipped with an image capturing capability (for example, a camera-equipped cellular phone). Combining this image-taking optical system with an image sensor or the like permits structuring an image-taking lens apparatus that optically captures a picture image of a subject and then outputs the image as an electrical signal. The image-taking optical lens apparatus is an optical apparatus that serves as a main component of a camera used for photographing a still image and a moving image of a subject. The image-taking optical lens apparatus is composed of, from the object (subject) side, for example, an image-taking optical system that forms an optical image of an object, and an image sensor that converts the optical image formed by the image-taking optical system into an electrical signal.

Used as the image sensor is a solid-state image sensor such as a CCD (charge-coupled device) or a CMOS (complementary metal-oxide-semiconductor) sensor having a plurality of pixels. An optical image formed by the image-taking optical system is converted into an electrical signal by the image sensor. The signal produced by the image sensor is, after being subjected to predetermined digital image processing, image compression processing, or other processing as necessary, recorded as a digital picture image in a memory (such as a semiconductor memory or an optical disk), and is then, as the case may be, transmitted to another appliance via a cable or after being converted into an infrared signal. Between the image-taking optical system and the image sensor, an optical filter (such as an optical low-pass filter or an infrared cut filter) is arranged as necessary.

Examples of cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, printers, and the like), other digital appliances, and the like. As these examples show, by the use of an image-taking lens apparatus, it is possible not only to build a camera but also to incorporate an image-taking lens apparatus in various devices to provide them with a camera capability. It is also possible to use an image-taking lens apparatus in a required manner so as to realize a camera capability. For example, an image-taking lens apparatus as a unit may be configured so as to be attachable to or rotatable about a camera body, or may be configured so as to be attachable to or rotatable about a personal digital appliance (such as a cellular phone or a PDA).

As is understood from the above description, the following constructions are included in each of the embodiments described above and examples to be described below. These constructions permit achieving a low-cost, slim, and compact image-taking lens apparatus that provides a satisfactory optical performance. The application of this image-taking lens apparatus to a camera, a digital appliance, or the like can contribute to performance enhancement, function enhancement, cost reduction, and downsizing of this appliance.

(T1) An image-taking lens apparatus comprising: an image-taking optical system for forming an optical image, and an image sensor for converting into an electrical signal the optical image formed by the image-taking optical system, wherein the image-taking optical system comprises a plurality of optical blocks each having a prism unit provided with a curved surface and an optical unit composed of a member different from a member composing the prism unit, wherein the prism unit uses the curved surface as a total reflection surface and also as a transmission surface, and wherein the optical unit has near the curved surface a curved surface identically or substantially identically shaped therewith.

(T2) The image-taking lens apparatus as described in the above (T1), wherein either of the conditional formulae (1) and (1a) is fulfilled.

(T3) The image-taking lens apparatus as described in either of the above (T1) and (T2), wherein the curved surface of the prism unit is a free curved surface.

(T4) The image-taking lens apparatus as described in any one of the above (T1) to (T3), wherein, between the plurality of optical blocks, there is provided an optical aperture stop.

(T5) The image-taking lens apparatus as described in the above (T4), wherein, between the plurality of optical blocks, there is provided a concave lens.

(C1) A camera, comprising the image-taking lens apparatus as described in any one of the above (T1) to (T5) to be thereby used for photographing at least one of a still image and a moving image of a subject.

(C2) The camera as described in the above (C1), corresponding to any of a digital camera, a video camera, and a camera incorporated in or externally fitted to any of a cellular phone, a personal digital assistant, a personal computer, a mobile computer, and a peripheral device therefor.

(D1) A digital appliance, comprising the image-taking lens apparatus as described in any one of the above (T1) to (T5) to be thereby provided with at least one of capabilities of photographing a still image of a subject and photographing a moving image of a subject.

(D2) The digital appliance as described in the above (D1), corresponding to any of a cellular phone, a personal digital assistant, a personal computer, a mobile computer, and a peripheral device therefor.

EXAMPLES

Hereinafter, practical examples of the image-taking optical system embodying the present invention will be presented with reference to their construction data and other data. Examples 1 and 2 presented below are numerical examples corresponding respectively to the first and second embodiments described above. Thus, optical path diagrams (FIGS. 1 and 2) showing the first and second embodiments also show the optical paths, optical constructions, and the like of Examples 1 and 2, respectively.

Tables 1 to 8 show the construction data of Examples 1 and 2. Table 9 shows the values for the conditional formulae as actually observed in examples 1 and 2. In the basic optical construction shown in Tables 1 and 5 (where i represents the surface number), Si (i=1, 2, 3, . . . ) represents the i-th surface counted from the object side (with S1 corresponding to a reference surface as a dummy surface and S2 corresponding to a surface located on the most object side in the image-taking optical system); ri (i=1, 2, 3, . . . ) represents the curvature of field (in mm) of the surface Si; Ni (i=1, 2, 3, . . . ) and vi (i=1, 2, 3, . . . ) represent the refractive index (Nd) for the d-line and the Abbe number (vd), respectively, of the optical material that fills the axial distance between the i-th surface Si and (i+1)th surface Si+1 counted from the object side; and f and FNO represent the focal length (in mm) and f-number, respectively, of the entire system. In Tables 1 and 5, image sizes (in mm) in the X direction (along the longer side of the screen) and the Y direction (along the shorter side of the screen) are also shown. Note that the image size in the Y direction is equal to H/2.

The arrangement of each surface Si in the Examples 1 and 2 is determined by the coordinates of a vertex and angle of rotation of each surface Si as shown in Tables 2 and 6. The surface data is expressed based on a right-handed orthogonal coordinate system (X, Y, Z). In the orthogonal coordinate system (X, Y, Z), a ray passing through the center of the object surface and the center of the image surface is defined as a base ray, the point of intersection of the base ray and the first surface S1 is defined as an origin point (0, 0, 0), and the Z direction is defined as the direction in which the base ray extends from the object center toward the point of intersection with the first surface S1, which direction is positive. In each of the optical path diagrams (FIGS. 1 and 2), the X-axis direction is perpendicular to the paper surface (with the direction extending from the front toward rear surface of the paper being defined as positive and with the counter-clockwise rotation as facing toward the paper surface being defined as positive X rotation), the Y-axis direction is a direction by which the right-handed system is formed together with the X-axis and the Z-axis (i.e., parallel to the paper surface). The vertex position of each surface is represented by coordinates of the vertex (X, Y, Z coordinates) (in mm). The inclination of each surface is represented by angles (in °) of rotations about X, Y, and Z axes (X rotation, Y rotation, and Z rotation) with respect to the vertex of the surface. The directions counterclockwise with respect the X axis and Y axis as viewed toward the positive direction are positive directions of angles of the X and Y rotations, respectively. The direction clockwise with respect to the Z axis as viewed toward the positive direction is a positive direction of the angle of the Z rotation.

In Tables 1 and 5, a surface Si marked with an asterisk * is a free curved surface and defined by formula (FS) below adopting a local orthogonal coordinate system (x, y, z) with the origin point located at the vertex of the surface. Tables 3, 4, 7, and 8 show free curved surface data of each Example. Here, it should be noted that the coefficient of any term that does not appear in the tables is equal to zero (k is equal to zero for all the free curved surfaces), and that, for all the data, E-n stands for "$\times 10^{-n}$".

$$z = c \cdot h^2 / \{1 + \sqrt{1 - (1+k)c^2 h^2}\} + \sum_{j=2}^{66} C_j x^m y^n \quad \text{(FS)}$$

where z represents the displacement in the z-axis direction at the height h (relative to the vertex);

h represents the height in a direction perpendicular to the z axis ($h^2 = x^2 + y^2$);

c represents the paraxial curvature (=the reciprocal of the radius of curvature);

k represents the conic coefficient; and

Cj represents the coefficient.

The term of a free curved surface is represented by formula (FC) below.

$$\sum_{j=2}^{66} C_j x^m y^n = C_2 \cdot x + C_3 \cdot y + C_4 \cdot x^2 + C_5 \cdot x \cdot y + C_6 \cdot y^2 + \\
C_7 \cdot x^3 + C_8 \cdot x^2 \cdot y + C_9 \cdot x \cdot y^2 + C_{10} \cdot y^3 + \\
C_{11} \cdot x^4 + C_{12} \cdot x^3 \cdot y + C_{13} \cdot x^2 \cdot y^2 + \\
C_{14} \cdot x \cdot y^3 + C_{15} \cdot y^4 + C_{16} \cdot x^5 + C_{17} \cdot x^4 \cdot y + \\
C_{18} \cdot x^3 \cdot y^2 + C_{19} \cdot x^2 \cdot y^3 + C_{20} \cdot x \cdot y^4 + \\
C_{21} \cdot y^5 + C_{22} \cdot x^6 + C_{23} \cdot x^5 \cdot y + C_{24} \cdot x^4 \cdot y^2 + \\
C_{25} \cdot x^3 \cdot y^3 + C_{26} \cdot x^2 \cdot y^4 + C_{27} \cdot x \cdot y^5 + \\
C_{28} \cdot y^6 + \cdots \quad \text{(FC)}$$

FIGS. 3A to 3F and 4A to 4F show lateral aberration diagrams for Example 1. FIGS. 5A to 5F and 6A to 6F show lateral aberration diagrams for Example 2. FIGS. 3A to 3F and 5A to 5F show lateral aberration in the X direction. FIGS. 4A to 4F and 6A to 6F show lateral aberration in the Y direction. Each aberration diagram shown in FIG. 3A to 3F through 6A to 6F indicates lateral aberration (in mm) for the d-line at the image height (in mm) represented by a local orthogonal coordinates (x, y). The scale of the aberration diagrams is −0.050 to 0.050 for the vertical axes and −1.0 to 1.0 for the horizontal axis.

The present invention can provide an image-taking optical system that is low-cost and very slim and also that offers a high performance for an image sensor having a great number of pixels. The use of the image-taking optical apparatus according to the invention in appliances such as digital cameras and personal digital assistants can contribute to performance enhancement, function enhancement, downsizing, cost reduction, and the like of these appliances.

TABLE 1

| Example 1 | f [mm] | 5.9 | | Image | X Dir. | 2.87 |
| | FNO | 2.8 | | Size [mm] | Y Dir. | 2.15 |

| Si | ri[mm] | Surface Type | Ni | vi | Optical Element |
|---|---|---|---|---|---|
| S1 | ∞ | Reference Surface | Air | | |
| S2 | ∞ | | 1.495 | 65 | PT |
| S3 | ∞ | | Air | | |
| S4 * | −20.548 | | 1.54 | 33 | U1 |
| S5 * | −85.714 | | Air | | |
| S6 * | −85.714 | TIR Surface (Transmission) | 1.63 | 58 | P1 |
| S7 * | −18.614 | Reflection Surface | 1.63 | 58 | |
| S8 * | −85.714 | TIR Surface (Total Reflection) | 1.63 | 58 | |
| S9 | −8.125 | | Air | | |
| S10 | ∞ | | Air | | ST |
| S11 | −7.384 | | 1.51 | 33 | LN |
| S12 | 39.123 | | Air | | |
| S13 | 7.505 | | 1.50 | 69 | P2 |
| S14 * | 8.123 | TIR Surface (Total Reflection) | 1.50 | 69 | |
| S15 * | −7.991 | Reflection Surface | 1.50 | 69 | |
| S16 * | 8.123 | TIR Surface (Transmission) | Air | | |
| S17 * | 8.123 | | 1.54 | 33 | U2 |
| S18 * | −14.048 | | Air | | |
| S19 | ∞ | Image Surface | | | SR |

TABLE 2

Example 1

| | Vertex Coordinates | | | Angle of Rotation | | |
|---|---|---|---|---|---|---|
| Si | X | Y | Z | X Rot. | Y Rot. | Z Rot. |
| S1 | 0 | 0 | 0 | 0 | 0 | 0 |
| S2 | 0 | 0 | 0 | 0 | 0 | 0 |
| S3 | 0 | 0 | 0.500 | 0 | 0 | 0 |
| S4 | 0 | −1.141 | 0.885 | 12.712 | 0 | 0 |
| S5 | 0 | 2.284 | 1.708 | 20.259 | 0 | 0 |
| S6 | 0 | 2.284 | 1.808 | 20.259 | 0 | 0 |
| S7 | 0 | 0.018 | 5.040 | −13.337 | 0 | 0 |
| S8 | 0 | 2.284 | 1.808 | 20.259 | 0 | 0 |
| S9 | 0 | 4.871 | 2.239 | 69.495 | 0 | 0 |
| S10 | 0 | 4.877 | 2.559 | 69.495 | 0 | 0 |
| S11 | 0 | 5.053 | 2.576 | 69.495 | 0 | 0 |
| S12 | 0 | 5.442 | 3.778 | 69.495 | 0 | 0 |
| S13 | 0 | 6.759 | 3.123 | 69.495 | 0 | 0 |
| S14 | 0 | 10.078 | 3.874 | 20.390 | 0 | 0 |
| S15 | 0 | 13.181 | 0.721 | −17.555 | 0 | 0 |
| S16 | 0 | 10.078 | 3.874 | 20.390 | 0 | 0 |
| S17 | 0 | 10.078 | 3.974 | 20.390 | 0 | 0 |
| S18 | 0 | 12.044 | 4.378 | 8.850 | 0 | 0 |
| S19 | 0 | 12.712 | 5.301 | 0 | 0 | 0 |

TABLE 3

Example 1

Curved Surface Coefficients of S4

| C4 | 4.913E−02 | C6 | 6.349E−02 | C8 | 1.454E−03 |
| C10 | −4.276E−04 | C11 | −3.370E−06 | C13 | −1.061E−04 |

TABLE 3-continued

Example 1

| C15 | -4.958E-04 | C17 | -5.800E-06 | C19 | 4.210E-05 |
| C21 | 1.890E-04 | C22 | -2.830E-06 | C24 | -5.340E-06 |
| C26 | -1.450E-05 | C28 | -2.670E-05 | | |

Curved Surface Coefficients of S5

| C4 | 1.408E-02 | C6 | 2.135E-02 | C8 | 1.730E-04 |
| C10 | -7.733E-04 | C11 | -8.500E-05 | C13 | -5.700E-05 |
| C15 | 6.620E-05 | C17 | -5.900E-05 | C19 | -3.940E-05 |
| C21 | -1.060E-05 | C22 | -1.960E-06 | C24 | -1.690E-05 |
| C26 | -6.890E-06 | C28 | 4.160E-07 | | |

Curved Surface Coefficients of S6

| C4 | 1.408E-02 | C6 | 2.135E-02 | C8 | 1.730E-04 |
| C10 | -7.733E-04 | C11 | -8.500E-05 | C13 | -5.700E-05 |
| C15 | 6.620E-05 | C17 | -5.900E-05 | C19 | -3.940E-05 |
| C21 | -1.060E-05 | C22 | -1.960E-06 | C24 | -1.690E-05 |
| C26 | -6.890E-06 | C28 | 4.160E-07 | | |

Curved Surface Coefficients of S7

| C4 | 3.399E-02 | C6 | 6.363E-02 | C8 | -1.606E-04 |
| C10 | -5.388E-03 | C11 | -3.110E-05 | C13 | -2.420E-05 |
| C15 | 9.020E-04 | C17 | -4.030E-05 | C19 | -8.720E-05 |
| C21 | -1.925E-04 | C22 | 1.160E-07 | C24 | 8.250E-06 |
| C26 | 1.210E-05 | C28 | 8.210E-06 | | |

Curved Surface Coefficients of S8

| C4 | 1.408E-02 | C6 | 2.135E-02 | C8 | 1.730E-04 |
| C10 | -7.733E-04 | C11 | -8.500E-05 | C13 | -5.700E-05 |
| C15 | 6.620E-05 | C17 | -5.900E-05 | C19 | -3.940E-05 |
| C21 | -1.060E-05 | C22 | -1.960E-06 | C24 | -1.690E-05 |
| C26 | -6.890E-06 | C28 | 4.160E-07 | | |

TABLE 4

Example 1

Curved Surface Coefficients of S14

| C4 | -4.424E-02 | C6 | -5.611E-02 | C8 | 9.490E-04 |
| C10 | 5.810E-04 | C11 | -2.917E-04 | C13 | -5.604E-04 |
| C15 | -2.241E-04 | C17 | 4.280E-05 | C19 | 4.060E-05 |
| C21 | -1.630E-07 | C22 | 5.370E-07 | C24 | -6.830E-06 |
| C26 | -3.920E-06 | C28 | -1.790E-06 | | |

Curved Surface Coefficients of S15

| C4 | 1.040E-01 | C6 | 8.758E-02 | C8 | 1.525E-03 |
| C10 | 4.351E-04 | C11 | 2.972E-04 | C13 | 5.904E-04 |
| C15 | -1.892E-04 | C17 | 1.915E-05 | C19 | 4.406E-05 |
| C21 | -1.510E-04 | C22 | 6.263E-07 | C24 | -4.665E-07 |
| C26 | 6.540E-06 | C28 | -1.520E-05 | | |

Curved Surface Coefficients of S16

| C4 | -4.424E-02 | C6 | -5.611E-02 | C8 | 9.490E-04 |
| C10 | 5.810E-04 | C11 | -2.917E-04 | C13 | -5.604E-04 |
| C15 | -2.241E-04 | C17 | 4.280E-05 | C19 | 4.060E-05 |
| C21 | -1.630E-07 | C22 | 5.370E-07 | C24 | -6.830E-06 |
| C26 | -3.920E-06 | C28 | -1.790E-06 | | |

Curved Surface Coefficients of S17

| C4 | -4.424E-02 | C6 | -5.611E-02 | C8 | 9.490E-04 |
| C10 | 5.810E-04 | C11 | -2.917E-04 | C13 | -5.604E-04 |
| C15 | -2.241E-04 | C17 | 4.280E-05 | C19 | 4.060E-05 |
| C21 | -1.630E-07 | C22 | 5.370E-07 | C24 | -6.830E-06 |
| C26 | -3.920E-06 | C28 | -1.790E-06 | | |

Curved Surface Coefficients of S18

| C4 | 2.755E-02 | C6 | 3.381E-03 | C8 | 7.129E-03 |
| C10 | -3.300E-02 | C11 | 3.445E-03 | C13 | 6.102E-03 |
| C15 | 1.287E-02 | C17 | -1.559E-04 | C19 | 9.330E-04 |
| C21 | 3.268E-03 | C22 | -1.980E-05 | C24 | -2.040E-04 |
| C26 | -5.842E-04 | C28 | -1.211E-03 | | |

TABLE 5

| Example 2 | f [mm] | 5.9 | | Image | X Dir. | 3.43 |
| | FNO | 2.8 | | Size [mm] | Y Dir. | 2.50 |

| Si | ri[mm] | Surface Type | Ni | vi | Optical Element |
|---|---|---|---|---|---|
| S1 | ∞ | Reference Surface | | Air | |
| S2 | ∞ | | 1.495 | 65 | PT |
| S3 | ∞ | | | Air | |
| S4 * | -20.563 | | 1.54 | 33 | U1 |
| S5 * | -84.184 | | | Air | |
| S6 * | -84.184 | TIR Surface (Transmission) | 1.63 | 58 | P1 |
| S7 * | -19.010 | Reflection Surface | 1.63 | 58 | |
| S8 * | -84.184 | TIR Surface (Total Reflection) | 1.63 | 58 | |
| S9 | -8.874 | | | Air | |
| S10 | ∞ | | | Air | ST |
| S11 | -7.384 | | 1.51 | 33 | LN |
| S12 | -142.704 | | | Air | |
| S13 | 7.883 | | 1.50 | 69 | P2 |
| S14 * | 7.500 | TIR Surface (Total Reflection) | 1.50 | 69 | |
| S15 * | -6.786 | Reflection Surface | 1.50 | 69 | |
| S16 * | 7.500 | TIR Surface (Transmission) | | Air | |
| S17 * | 7.500 | | 1.54 | 33 | U2 |
| S18 * | 206.298 | | | Air | |
| S19 | ∞ | Image Surface | | | SR |

TABLE 6

Example 2

| | Vertex Coordinates | | | Angle of Rotation | | |
|---|---|---|---|---|---|---|
| Si | X | Y | Z | X Rot. | Y Rot. | Z Rot. |
| S1 | 0 | 0 | 0 | 0 | 0 | 0 |
| S2 | 0 | 0 | 0 | 0 | 0 | 0 |
| S3 | 0 | 0 | 0.500 | 0 | 0 | 0 |
| S4 | 0 | -1.141 | 0.885 | 12.712 | 0 | 0 |
| S5 | 0 | 2.284 | 1.708 | 20.259 | 0 | 0 |
| S6 | 0 | 2.284 | 1.808 | 20.259 | 0 | 0 |
| S7 | 0 | 0.018 | 5.040 | -13.337 | 0 | 0 |
| S8 | 0 | 2.284 | 1.808 | 20.259 | 0 | 0 |
| S9 | 0 | 4.871 | 2.239 | 69.495 | 0 | 0 |
| S10 | 0 | 4.781 | 2.539 | 69.495 | 0 | 0 |
| S11 | 0 | 5.053 | 2.576 | 69.495 | 0 | 0 |
| S12 | 0 | 5.442 | 3.778 | 69.495 | 0 | 0 |
| S13 | 0 | 6.318 | 2.829 | 73.131 | 0 | 0 |
| S14 | 0 | 10.393 | 3.682 | 17.504 | 0 | 0 |
| S15 | 0 | 13.206 | 1.166 | -18.801 | 0 | 0 |
| S16 | 0 | 10.393 | 3.682 | 17.504 | 0 | 0 |
| S17 | 0 | 10.393 | 3.974 | 17.504 | 0 | 0 |
| S18 | 0 | 12.044 | 4.378 | 8.850 | 0 | 0 |
| S19 | 0 | 12.721 | 5.308 | 0 | 0 | 0 |

TABLE 7

Example 2

Curved Surface Coefficients of S4

| C4 | 5.118E-02 | C6 | 6.505E-02 | C8 | 1.216E-03 |
| C10 | -6.120E-04 | C11 | 1.459E-05 | C13 | -2.527E-04 |
| C15 | -5.025E-04 | C17 | 6.401E-06 | C19 | 6.647E-05 |
| C21 | 1.879E-04 | C22 | -8.902E-07 | C24 | -8.090E-06 |
| C26 | -1.545E-05 | C28 | -2.314E-05 | | |

TABLE 7-continued

Example 2

Curved Surface Coefficients of S5

| | | | | | |
|---|---|---|---|---|---|
| C4 | 1.457E−02 | C6 | 2.116E−02 | C8 | −6.986E−05 |
| C10 | −6.781E−04 | C11 | −3.735E−05 | C13 | −5.904E−06 |
| C15 | 5.399E−05 | C17 | −4.883E−05 | C19 | −2.973E−05 |
| C21 | −4.899E−06 | C22 | −5.966E−07 | C24 | −1.628E−05 |
| C26 | −1.561E−06 | C28 | 5.841E−07 | | |

Curved Surface Coefficients of S6

| | | | | | |
|---|---|---|---|---|---|
| C4 | 1.457E−02 | C6 | 2.116E−02 | C8 | −6.986E−05 |
| C10 | −6.781E−04 | C11 | −3.735E−05 | C13 | −5.904E−06 |
| C15 | 5.399E−05 | C17 | −4.883E−05 | C19 | −2.973E−05 |
| C21 | −4.899E−06 | C22 | −5.966E−07 | C24 | −1.628E−05 |
| C26 | −1.561E−06 | C28 | 5.841E−07 | | |

Curved Surface Coefficients of S7

| | | | | | |
|---|---|---|---|---|---|
| C4 | 3.393E−02 | C6 | 6.500E−02 | C8 | −4.461E−04 |
| C10 | −4.403E−03 | C11 | −9.704E−06 | C13 | 5.354E−06 |
| C15 | 4.474E−04 | C17 | −3.232E−05 | C19 | −1.104E−04 |
| C21 | −7.013E−05 | C22 | 1.290E−06 | C24 | 7.994E−06 |
| C26 | 2.343E−05 | C28 | 2.714E−06 | | |

Curved Surface Coefficients of S8

| | | | | | |
|---|---|---|---|---|---|
| C4 | 1.457E−02 | C6 | 2.116E−02 | C8 | −6.986E−05 |
| C10 | −6.781E−04 | C11 | −3.735E−05 | C13 | −5.904E−06 |
| C15 | 5.399E−05 | C17 | −4.883E−05 | C19 | −2.973E−05 |
| C21 | −4.899E−06 | C22 | −5.966E−07 | C24 | −1.628E−05 |
| C26 | −1.561E−06 | C28 | 5.841E−07 | | |

TABLE 8

Example 2

Curved Surface Coefficients of S14

| | | | | | |
|---|---|---|---|---|---|
| C4 | −4.672E−02 | C6 | −6.516E−02 | C8 | 6.611E−04 |
| C10 | 6.928E−04 | C11 | −2.664E−04 | C13 | −5.709E−04 |
| C15 | −2.095E−04 | C17 | 9.804E−05 | C19 | 3.416E−05 |
| C21 | −2.722E−06 | C22 | −1.118E−05 | C24 | −1.628E−05 |
| C26 | −1.136E−05 | C28 | −5.363E−06 | | |

Curved Surface Coefficients of S15

| | | | | | |
|---|---|---|---|---|---|
| C4 | 1.152E−01 | C6 | 9.206E−02 | C8 | 1.730E−03 |
| C10 | 1.261E−03 | C11 | 4.050E−04 | C13 | 9.973E−04 |
| C15 | −4.899E−04 | C17 | 4.943E−05 | C19 | 1.257E−04 |
| C21 | −3.325E−04 | C22 | 2.818E−06 | C24 | 2.139E−05 |
| C26 | 2.713E−05 | C28 | −3.133E−05 | | |

Curved Surface Coefficients of S16

| | | | | | |
|---|---|---|---|---|---|
| C4 | −4.672E−02 | C6 | −6.516E−02 | C8 | 6.611E−04 |
| C10 | 6.928E−04 | C11 | −2.664E−04 | C13 | −5.709E−04 |
| C15 | −2.095E−04 | C17 | 9.804E−05 | C19 | 3.416E−05 |
| C21 | −2.722E−06 | C22 | −1.118E−05 | C24 | −1.628E−05 |
| C26 | −1.136E−05 | C28 | −5.363E−06 | | |

Curved Surface Coefficients of S17

| | | | | | |
|---|---|---|---|---|---|
| C4 | −4.672E−02 | C6 | −6.516E−02 | C8 | 6.611E−04 |
| C10 | 6.928E−04 | C11 | −2.664E−04 | C13 | −5.709E−04 |
| C15 | −2.095E−04 | C17 | 9.804E−05 | C19 | 3.416E−05 |
| C21 | −2.722E−06 | C22 | −1.118E−05 | C24 | −1.628E−05 |
| C26 | −1.136E−05 | C28 | −5.363E−06 | | |

Curved Surface Coefficients of S18

| | | | | | |
|---|---|---|---|---|---|
| C4 | −2.470E−02 | C6 | 1.849E−02 | C8 | −2.575E−03 |
| C10 | −4.897E−02 | C11 | 1.911E−03 | C13 | 1.035E−02 |
| C15 | 4.911E−03 | C17 | 2.950E−04 | C19 | 7.467E−04 |
| C21 | 8.374E−03 | C22 | −2.708E−06 | C24 | −2.460E−04 |
| C26 | −5.184E−04 | C28 | −1.920E−03 | | |

TABLE 9

| Conditional Formula(1), (1a) | D/H |
|---|---|
| Example 1 | 1.23 |
| Example 2 | 1.06 |

What is claimed is:

1. An image-taking optical system for forming an optical image of an object on a light-receiving surface of an image sensor, the image-taking optical system comprising:
 a plurality of optical blocks each having a prism unit provided with a curved surface and an optical unit composed of a member different from a member composing the prism unit,
 wherein the prism unit uses the curved surface as a total reflection surface and also as a transmission surface, and
 wherein the optical unit has near the curved surface a curved surface identically or substantially identically shaped therewith.

2. The image-taking optical system according to claim 1, wherein conditional formula below (1) is fulfilled:

$$D/H < 2.0 \quad (1)$$

where
 H represents a length of a screen of the image sensor along a shorter side thereof, and
 D represents a length from a most object side surface of the image-taking optical system to the image sensor in a direction perpendicular to the screen of the image sensor.

3. The image-taking optical system according to claim 1, wherein conditional formula (1a) below is fulfilled:

$$D/H < 1.5 \quad (1a)$$

where
 H represents a length of a screen of the image sensor along a shorter side thereof, and
 D represents a length from a most object side surface of the image-taking optical system to the image sensor in a direction perpendicular to the screen of the image sensor.

4. The image-taking optical system according to claim 1, wherein the curved surface of the prism unit is a free curved surface.

5. The image-taking optical system according to claim 1, wherein an optical aperture stop is provided between the plurality of optical blocks.

6. The image-taking optical system according to claim 5, wherein a concave lens is provided between the plurality of optical blocks.

7. An image-taking lens apparatus comprising an image-taking optical system for forming an optical image and an image sensor for converting into an electrical signal the optical image formed by the image-taking lens system,
 wherein the image-taking optical system comprises a plurality of optical blocks each having a prism unit provided with a curved surface and an optical unit composed of a member different from a member composing the prism unit, wherein the prism unit uses the curved surface as a total reflection surface and also as a transmission surface, and wherein the optical unit has near the curved surface a curved surface identically or substantially identically shaped therewith.

8. The image-taking lens apparatus according to claim 7, wherein conditional formula (1) is fulfilled:

$$D/H < 2.0 \qquad (1)$$

where
- H represents a length of a screen of the image sensor along a shorter side thereof, and
- D represents a length from a most object side surface of the image-taking optical system to the image sensor in a direction perpendicular to the screen of the image sensor.

9. The image-taking lens apparatus according to claim 7, wherein conditional formula (1a) is fulfilled:

$$D/H < 1.5 \qquad (1a)$$

where
- H represents a length of a screen of the image sensor along a shorter side thereof, and
- D represents a length from a most object side surface of the image-taking optical system to the image sensor in a direction perpendicular to the screen of the image sensor.

10. The image-taking lens apparatus according to claim 7, wherein the curved surface of the prism unit is a free curved surface.

11. The image-taking lens apparatus according to claim 7, wherein an optical aperture stop is provided between the plurality of optical blocks.

12. The image-taking lens apparatus according to claim 7, wherein a concave lens is provided between the plurality of optical blocks.

* * * * *